United States Patent Office 3,194,776
Patented July 13, 1965

3,194,776
POLYMERIC PLASTICIZERS OF POLYESTERS OF DIMETHYLMALONIC ACID AND A GLYCOL
John R. Caldwell, Kingsport, Tenn., assignor to Eastman Kodak Company, Rochester, N.Y., a corporation of New Jersey
No Drawing. Filed June 3, 1957, Ser. No. 662,972
4 Claims. (Cl. 260—31.6)

This invention relates to polymeric linear polyesters having certain excellent physical characteristics which particularly include a high degree of resistance to hydrolysis and superior electrical properties such as volume resistivity, a high dielectric constant, etc. These polyesters are in each instance derived from the condensation of a bifunctional dicarboxylic compound with a gem-dialkyl glycol. More particularly, the gem-dialkyl glycol which is preferred is neopentyl glycol (sometimes referred to as NPG) which is also more precisely called 2,2-dimethyl-1,3-propanediol.

The low-molecular weight polyesters derived from neopentyl glycol condensed with a bifunctional dicarboxylic acid such as o-phthalic acid, succinic acid, adipic acid, azelaic acid, sebacic acid or the like are characterized by a high resistance to hydrolysis and superior properties which are especially advantageous when such polyesters in the form of clear viscous liquids are incorporated into cellulose derivatives and vinyl polymers where they serve as plasticizers of excellent permanence since the low-molecular weight polyester is highly resistant to hydrolysis and various weathering effects and also possesses little tendency to migrate to other materials with which such plasticized compositions might come into contact. An unexpectedly superior polymeric plasticizer for polyvinyl chloride is described and covered in a concurrently filed application Serial No. 662,974, in the names of James E. Hutchins and E. Willan Wilson, entitled "Polymeric Plasticizer from Neopentyl Glycol, Adipic Acid and 2-Ethylhexanol," now abandoned.

Although the employment of neopentyl glycol and other gem-dialkyl glycols has been mentioned in patents and elsewhere in the literature as a suitable glycol for the preparation of polyesters, nothing in the prior art indicates that this particular glycol can be employed to especial advantage in condensation with dimethylmalonic compounds and certain straight chain dicarboxylic compounds to form particularly advantageous polyesters for certain purposes.

The prior art describes various ways of condensing bifunctional dicarboxylic compounds with glycols to produce polyesters having any desired molecular weight. U.S. Patent 2,617,779 describes plasticized vinyl resins employing as plasticizers certain polyesters derived from the condensation of glycols such as propylene glycol condensed with dicarboxy compounds such as adipic acid or azelaic acid and this patent further describes how such polyesters are prepared so as to have the desired molecular weight and viscosity.

It is well known that low molecular weight chain-stopped polyesters which are linear, permanently fusible liquid polyesters can be prepared using a chain-stopping alcohol by reacting together a mixture of ingredients comprising (A) a saturated aliphatic glycol, (B) a saturated aliphatic bifunctional dicarboxylic acid, and (C) a saturated aliphatic monohydric alcohol, e.g., propanol, isobutanol, 2-ethyl hexanol, other isomers and mixtures of isomers of octyl alcohol, decanol, etc. It is generally preferable to employ chain-stopping alcohols containing at least 6 carbon atoms so as to achieve a higher degree of compatibility between the liquid polyester which is being produced and the vinyl resin which is to be plasticized therewith. The prior art discloses the use of many glycols but indicates preference for branched chain glycols such as 1,2-propylene glycol and ether glycols such as dipropylene glycol, tetraethylene glycol, etc.

The use in the prior art of numerous saturated aliphatic dicarboxylic acids includes malonic acid, succinic acid, glutaric acid, sebacic acid, azelaic acid, adipic acid, pimelic acid, as well as branched chain isomers of such acids.

Another patent having some bearing on the preparation of permanently fusible liquid polyesters is U.S. 2,483,726 which describes polyesters prepared from malonates having an aliphatic hydrocarbon substituent in which the aliphatic substituent contains from 6 to 16 or more carbon atoms. This patent indicates that the polyesters produced from such substituted malonates possess numerous advantages over polyesters produced from the low aliphatic substituted malonates or unsubstituted malonates, which is in direct contrast to the discoveries made by the inventors in the present application to the effect that dimethylmalonic compounds condensed with neopentyl glycol result in exceptionally valuable permanently fusible liquid polyesters. The preparation of high molecular weight linear fiber and film-forming polyesters from dimethylmalonic acid is described in copending Caldwell application 572,633, filed March 20, 1956, wherein the polyesters disclosed and claimed are highly polymeric and have molecular weights well above 10,000 to 12,000.

U.S. 2,483,726 which describes the polyester produced from the malonates having an aliphatic hydrocarbon substituent containing from 6 to 16 or more carbon atoms condensed with a glycol such as ethylene glycol discloses that this ester product has been found to be of considerable value as a plasticizer for cellulose acetate and other cellulose derivatives and to a lesser extent as a plasticizer for vinyl resins. Nothing in this patent describes the employment of a gem-dialkyl glycol such as neopentyl glycol nor the employment of the simple dimethylmalonic compounds. In fact, the teachings of this prior art emphasize the unexpected and unobvious character of the applicant's discoveries now being described.

An object of this invention is to provide novel polymeric plasticizers that are derived from neopentyl glycol, otherwise known as 2,2-dimethyl-1,3-propanediol. A further object of this invention is to provide new and improved plasticized plastic compositions such as cellulose esters and polymerized vinyl type resinous compositions. Another object of this invention is to provide polymeric plasticizers that are derived from the lower dialkylmalonic compounds, especially dimethylmalonic acid or esters thereof.

It is a further object of this invention to provide plasticizers of the polymeric type which possess low volatility, minimum tendency to migrate, unusually high resistance to extraction by solvents, oils and sudsy water, are highly resistant to hydrolysis, possess excellent electrical properties and have a high degree of compatibility with the plastic composition being plasticized, and which also do not require the addition of other lower molecular weight plasticizers to supplement their plasticizing action.

As previously mentioned above, the copending application filed by Caldwell which describes the preparation of high molecular weight polyesters derived from dimethylmalonic compounds condensed with neopentyl glycol is based upon the discovery of the unusual characteristics associated with the extremely highly polymeric condensation products.

In contrast, the objects of the present invention can be accomplished according to a preferred embodiment by heating an ester of a dialkylmalonic acid (wherein the alkyl groups contain from 1 to 4 carbon atoms) with neopentyl glycol under conditions that produce a low-molecular weight polyester. The polymeric products of the invention so produced are compatible with cellulose esters, polyvinyl chloride, polymethyl methacrylate, etc. The higher molecular weight polyesters (M.W. above 4000–5000) are incompatible with plastic compositions and cannot be used as plasticizers.

The low-molecular weight polyesters are also valuable in the formation of protective coatings such as oil paints, varnishes, lacquers, enamels, and water paints. Their exceptional resistance to hydrolysis makes them particularly useful as components for outdoor employment.

The polymeric plasticizers of this invention are of particular value for the manufacture of plasticized polyvinyl chloride sheets such as are used for shower curtains, raincoats, and in wading pools and swimming pools. It is well known that the ordinary plasticizers tend to leach out of thin sheets during prolonged contact with water. In contrast to this, it has been found that the polymeric plasticizers of the present invention show excellent permanence under these conditions. Resistance to hydrolysis is also of great importance. Many of the previously known polymeric plasticizers made from aliphatic acids such as adipic, succinic or sebacic, are hydrolyzed in a relatively short time when exposed to water. The plasticizers made from aromatic acids which have been known in the art are only slightly better in this regard. The polymeric plasticizers made from the usual aliphatic and aromatic acids with diethylene glycol or triethylene glycol are especially unstable toward hydrolysis. Hence, it was very surprising to discover that the polymeric plasticizers made from dialkylmalonic acids are, for all practical purposes, completely resistant to hydrolysis under normal conditions of use. Even those containing diethylene glycol are quite good in this respect.

Among the dialkylmalonic compounds which can be used in accordance with this aspect of the invention are compounds represented by the following general formula:

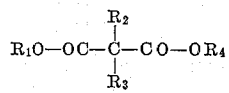

wherein each of $R_1$ and $R_4$ represents a hydrogen atom or any lower alkyl radical containing from 1 to 6 carbon atoms and each of $R_2$ and $R_3$ may be methyl, ethyl, propyl, or butyl or various isomers thereof such as isopropyl, isobutyl, secondary butyl, tertiary butyl, etc. The most especially advantageous compounds are dimethylmalonic acid and the lower alkyl esters thereof.

Thus, this aspect of the invention provides a linear polymeric polyester having a molecular weight of 800 to 2000 derived from the condensation of a bifunctional glycol and a dialkylmalonic compound having the formula:

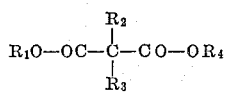

wherein each of $R_1$ and $R_4$ represents a member selected from the group consisting of a hydrogen atom and lower alkyl radicals and each of $R_2$ and $R_3$ represents an alkyl radical containing from 1 to 4 carbon atoms, which polyester is characterized by being a viscous liquid which can be boiled with water for 96 hours without hydrolysis exceeding about 0.3%.

In general, any glycol can be used to prepare useful polymeric plasticizers from such dialkylmalonic compounds. Suitable examples include ethylene glycol, trimethylene glycol, pentamethylene glycol, decamethylene glycol, 1,2-propylene glycol, 1,3-butylene glycol, 2,5-hexylene glycol, diethylene glycol, etc. However, those glycols which contain gem-dialkyl substituents have been found to be unusually valuable and to form polymeric plasticizers having exceptionally worthwhile physical and chemical characteristics. Therefore, this invention is particularly concerned with the employment of neopentyl glycol although the homologous gem-dialkyl glycols can also be similarly employed. Of course, mixtures of other aliphatic and aromatic bifunctional dicarboxylic compounds can be employed along with the dialkylmalonic compounds in preparing the polyesters. Similarly, mixtures of other glycols including straight-chain, branched-chain and ether-type glycols can be employed. However, the most advantageous polyesters of this invention are derived by the condensation of dimethylmalonic compounds with neopentyl glycol, sometimes hereinafter referred to as NPG and more accurately designated as 2,2-dimethyl-1,3-propanediol.

Thus, this aspect of the invention provides in a linear polymeric polyester having an average molecular weight of from about 800 to about 2000 containing recurring ester units having the formula:

wherein —OC—R—CO— is derived from no more than two different bifunctional dicarboxy compounds and —O—R'—O— is derived from no more than two bifunctional glycols, the improvement which consists of having at least 70 mole percent of —O—R'—O— derived from neopentyl glycol and having at least 70 mole percent of —OC—R—CO— derived from a dimethylmalonic compound, which polyester is characterized in that contact with boiling water for 96 hours produces substantially no hydrolytic deterioration.

The products of this invention can be divided into classes depending upon the manner in which these polyester products are produced:

(1) Polyesters made by using excess bifunctional dicarboxylic compounds, especially the dialkylmalonic compounds, (2) Polyesters made by using excess glycol, especially NPG, and (3) Polyesters made so as to incorporate a chain-stopping monohydric aliphatic alcohol or monobasic acid.

The preferred polymeric plasticizers of this invention can be produced in accordance with an aspect of this invention which provides in a process for preparing a linear highly polymeric polyester made up of a chain of recurring ester units having a total average molecular weight of from about 800 to about 2000 which comprises condensing one mole proportion of from one to two bifunctional dicarboxylic compounds containing the residue —OC—R—CO— with about $1+x$ mole proportion of from one to two bifunctional glycols containing the residue —O—R'—O— in the presence of a chain-stopping component selected from the group consisting of (a) about 0.2 to about 0.5 mole proportion of a monofunctional aliphatic carboxy compound where $x$ is about 0.1 to about 0.2 (b) about 0.2 to about 0.5 mole proportion of a monofunctional aliphatic alcohol where $x$ is about $-0.1$ to about $-0.2$, (c) about 0.2 to 0.4 mole proportion of at least one of said bifunctional glycols where $x$ is 0, and (d) about 0.2 to 0.4 mole proportion of at least one of said bifunctional dicarboxylic compounds where $x$ is 0, the improvement which consists of having at least 70 mole percent of —O—R'—O— derived from neopentyl glycol and having at least 70 mole percent of —OC—R—CO— derived from a dimethylmalonic compound, whereby the polyester produced is characterized in that exposure to water for 96 hours at about 100° C. produces substantially no hydrolytic deterioration and the polyester is useful as a plasticizer for cellulose esters and polymeric vinyl compounds producing plasticized plastic compositions having exceptionally high hydrolytic stability and plasticizer permanence.

In general, compositions which are prepared in this manner have optimum chain length. Thus, the molecular weight of such polyesters is high enough to prevent loss of such polyesters from plastic compositions resulting from volatility or extraction but the molecular weight is not too high for good compatibility with the plastic composition. Those cases involving the preparation of mixed polymeric plasticizers should not contain more than up to about 30 mole percent of another dicarboxylic bifunctional compound of either aliphatic or aromatic character. The same limitation is preferably applied to the employment of mixtures of glycols which contain glycols other than neopentyl or an equivalent gem-dialkyl glycol.

The polymeric plasticizers can be advantageously made by ester interchange between the glycol and a lower alkyl ester of the dialkylmalonic acid. Any of the known ester interchange catalysts useful in the preparation of polyesters can be employed as described in the copending Caldwell application which describes the high molecular weight polyesters. The reaction is heated and stirred advantageously at 120°–200° C. under conditions that allow the alcohol to distill from the reaction vessel. The reaction can then be completed to the desired degree of polymerization by the employment of reduced pressure. Although the free dialkylmalonic acids can be employed, they have a tendency to decarboxylate at temperatures above 100°–120° C. and are not employed in accordance with the preferred practice of this aspect of the invention. In order to obtain a polyester useful as a plasticizer having optimum stability, it is preferable to remove the catalyst at the end of the reaction. This can be done when an acid catalyst such as toluene sulfonic acid is employed by washing with a dilute solution of sodium carbonate. When an alkaline catalyst such as calcium oxide is used, it can be neutralized by adding acetic acid to the product and filtering off the calcium acetate. Alternatively, the catalyst may be removed by washing with a dilute acid solution.

The process for preparing the liquid low-molecular weight polyesters of the present aspect of the invention differs from the process employed in the preparation of the fiber and film-forming polyesters described in the copending Caldwell application primarily in the fact that the reaction is conducted under conditions that leave in the reaction product of the present invention a molar excess in the range of from 10–50 percent and preferably in the range of 20–40 percent of either the dicarboxylic component or the glycol component. By employing such conditions, it is not possible for the final product to acquire that high degree of polymerization useful in fiber and film-forming polyesters which are produced by conducting the reaction under conditions that distill out the components in excess (usually the glycol) and promote the formation of a highly polymeric product that contains essentially a 1:1 molar ratio of the two reactants.

The products of the present aspect of the instant invention have a maximum molecular weight of about 2000 and in many cases the molecular weight is less than 1000 whereas the minimum molecular weights required for the production of fibers and films is about 10,000-12,000. The products of the present invention are useful plasticizers compatible with a wide variety of plastic compositions such as cellulose derivatives, vinyl polymers, phenolic resins, alkyd resins, etc, whereas the film and fiber-forming polymers are generally incompatible and tend to crystallize out of mixtures. The products of the present invention generally melt below 60–70° C. and in most cases melt below 40–50° C. whereas the fiber and film forming polyesters melt at temperatures approaching 200° C. or much higher.

The products of the present invention can be made by using and maintaining during the course of the reaction a definite excess of one of the reactants which acts as a chain terminator. The final product has a substantially constant composition regardless of the reaction time or temperature and as a result the molecular weight can be controlled within close limits. It has been found that optimum plasticizing properties are obtained only within a certain range of molecular weights or chain length ranges. If the chain length is too great, the polyester becomes less compatible, while if the chain length is too short, the polyester is too volatile and is readily extracted by water and solvents.

There are two methods of addition which can be used in synthesis of monobasic acid or alcohol terminated polyester plasticizers.

By the first such method, the NPG and dibasic acids are combined in the proper molar ratio (using excess acid or glycol) and reacted until the acid number reaches a minimum. At this point, the desired molecular weight has been achieved depending on the molar ratio of reactants. The vessel is then charged with the terminating acid or alcohol and the reaction then carried to completion. The reaction starts at zero time and an original acid number of several hundred. During the early hours of the reaction this acid number diminishes rapidly until it eventually approaches a practical minimum. Two alternatives then exist: (1) where excess NPG was initially used, a terminating acid is added and the acid number jumps to something over 100 where it seems to drop off as a relatively straight line function; or (2) where excess acid was initially used, a terminating alcohol is used to produce an alcohol terminated polyester. The reaction is identical in (1) and (2) except that on the theoretical chain in (2), the end groups are carboxylic rather than hydroxyl. This of course, limits the decrease in acid number so that when the time comes, there is a sharp drop in acid number as the terminating alcohol is added. This is followed by a leveling off as the terminating alcohol reacts with the terminal carboxylic groups.

The second method of synthesis of these monobasic acid or alcohol terminated polyesters is one wherein all of the reactants are charged into the reaction vessel in proportion to their mole function concentration. This method works well in many operations especially in those syntheses where transesterification catalysts are used. This reaction progress can be followed by acid number drop, and the acid number will drop to a minimum of something less than unity in the final stripping operation. The reaction time is generally less than in the first method for producing such terminated polyesters.

NPG is a solid and as such, introduces the problems of solid feed equipment. In the early stages of reaction the compound has a tendency to sublime, particularly if the reaction temperature is above 125° C. In most production equipment this is no problem but on the laboratory scale where equipment is characterized by small ports it may present some problem. These problems can be overcome by using vacuum jacketed columns, however. Another problem is the tendency to form cyclic polyesters. The cyclization is a reformation reaction occurring under high heat in the presence of catalyst, usually at the end of the reaction where the excess terminating compound is being removed. This cyclization can be diminished by proper selections of reaction conditions. The small amount of the cyclic compound which may remain does not show any appreciable adverse behavior effects in the plasticized plastic compositions and does not significantly affect the resultant polyester plasticizer.

The plastic compositions which can be plasticized have different properties depending upon the effect of chain length in acid terminated polyesters of constant degree of polymerization and of alkyl alcohol terminated polyesters of varying degree of polymerization. Using a series of acid terminated polyesters where the terminating acid is varied from capric acid (10 carbons) through stearic acid (18 carbon atoms) at a concentration of 50 phr. in polyvinylchloride, it can be observed that as the chain length is increased, there is a decrease in the usual mechanical properties of tensile strength, ultimate elongation and tear resistance. The low temperature properties, as measured by torsional modulus, improve as the length of the terminating acid chain is diminished. The permanence properties of extractions by polar and nonpolar solvents as well as loss to activated carbon are not seriously affected by the length of the acid chain over the range just mentioned.

When a group of decyl alcohol terminated adipic acid-NPG polyesters in which the degree of polymerization is varied from five to eleven were tested at 50 phr. plasticizer concentration in polyvinylchloride, there was found to be an increase in the mechanical properties as the degree of polymerization was increased. The increase is shown in the durometer hardness. The low temperature properties as measured by torsional modulus appear to vary inversely with the degree of polymerization. The degree of polymerization has little effect on the activated carbon or soapy water losses. There is, however, an expected decrease in heptane loss as the degree of polymerization is increased.

The excellent characteristics of the plasticizers of the present invention in regard to water extraction can be measured in accordance with ASTM procedure D1239 and the characteristics pertaining to loss of volatility by ASTM procedure D1203. The extent of hydrolysis of the plasticizers of this aspect of the invention can be determined by boiling the plasticizer in water for 96 hours and titrating the free acid.

The polymeric plasticizers of this invention are viscous liquids or waxy solids that are soluble in common solvents such as benzene, toluene, the lower alcohols, ketones, esters, chlorinated hydrocarbons, etc.

These polymeric plasticizers are of particular value as plasticizers for polyvinyl chloride and interpolymers of vinyl chloride with vinylidene chloride, vinyl acetate, acrylonitrile, vinylidene cyanide, isopropenyl acetate, etc. These polymeric plasticizers are also useful in cellulose acetate, cellulose triacetate, cellulose propionate, cellulose acetate-butyrate, cellulose butyrate, etc.

These polymeric plasticizers can also be used in combination with other plasticizers including those described in this specification as well as other polymeric ester plasticizers known in the art or with monomeric plasticizers known in the art. These plasticizers can be incorporated with the resinous compositions to be plasticized by the usual rolling and mixing methods. They may also be added to solutions or dopes prior to extrusion or casting.

By following the above described procedure for preparing the polymeric plasticizers, it is not necessary to use a chain-stopping agent such as a monohydric alcohol although the preparation of chain-stopped polyesters is contemplated within the scope of this aspect of the invention since the products are essentially analogous to those produced without such chain-stopping agents. In fact, it is an advantage of this invention which makes it unnecessary to employ a chain-stopping agent since the omission of the incorporation of such an agent in the process eliminates an unnecessary step thereby improving the simplicity with which the present invention can be practiced.

EXAMPLE 1

As an example illustrative of the preparation of the polymeric plasticizers according to one embodiment of the invention, a polymeric plasticizer terminated in free hydroxyl groups was prepared from 5 molecular proportions of dibutyl dimethylmalonate condensed with 4 molecular proportions of 2,2-dimethyl-1,3-propanediol neopentyl glycol). The catalyst employed for effecting the condensation was sodium butoxide. This catalyst was employed in a proportion of 0.01 percent by weight of the reactants. The reactants including the catalyst were placed in a round-bottomed flask equipped with a thermometer, a mechanical stirrer, and a 6-inch fractionating column packed with ¼-inch saddles. The mixture was stirred and heated and butyl alcohol was taken off at the head of the column at such a rate as to keep the boiling point of the mixture below 200° C. After 4 to 6 hours, no more alcohol came off at this temperature. The system was then evacuated to a pressure of 50–75 mm. of mercury and the reaction continued, keeping the temperature below 230° C. until no more butyl alcohol distilled out. During the course of the reaction about 96 percent of the theoretical quantity of butyl alcohol was collected. The product obtained was a low-melting solid which was nearly colorless. It was very resistant to hydrolysis and was found when tested for 96 hours in boiling water to have hydrolyzed to an extent of less than 0.1 percent.

This polymeric plasticizer derived from dimethylmalonic acid and neopentyl glycol in an amount of about 35 parts by weight was milled on heated rolls with 100 parts by weight of cellulose acetate-butyrate and the composition so produced was granulated and molded in a standard injection press so as to give molded pieces which were quite clear and from which the plasticizer showed no tendency to exude. The resistance to extraction by water and to loss on heating were excellent. This plasticizer was also compatible with other derivatives of cellulose such as the triacetate, etc.

Thirty parts by weight of this plasticizer were dissolved in a dope of 100 parts of cellulose triacetate dissolved in 540 parts by weight of methylene chloride and 60 parts by weight of methanol and films were cast from this dope which were clear and flexible. Similarly, plasticized films were made from cellulose acetate containing various proportions of acetyl groups. Other plasticized films were made from polyvinyl chloride. This plasticizer can also be advantageously employed as a component of paints, varnishes, and water-based coating compositions.

By employing the process described in Example 1 above, other polymeric plasticizers can be prepared using other derivatives of dimethylmalonic acid and other glycols. Such products were prepared and tested as plasticizers in various resinous compositions including cellulose esters and polymerized vinyl compounds. Hydrolysis test data for representative polymeric plasticizers (Group A) are summarized in the table below along with the values for similar plasticizers (Group B) made with straight-chain acids and an aromatic acid:

*Hydrolytic stability*

| Polymeric Plasticizer in terms of Components | | Hydrolysis in boiling water, percent after 96 hrs. |
|---|---|---|
| Moles Acid Ester | Moles Glycol | |
| Group A: | | |
| 4 Isobutyl dimethylmalonate | 3 Diethylene | 0.20 |
| 10 Butyl dimethylmalonate | 9 Diethylene | 0.28 |
| 4 Butyl dimethylmalonate | 5 Diethylene | 0.25 |
| 4 Butyl dimethylmalonate | 3 Propylene-1,2 | 0.11 |
| 4 Butyl dimethylmalonate | 3 Ethylene | 0.14 |
| 4 Methyl methylethylmalonate | 5 Ethylene | 0.20 |
| 4 Ethyl diethylmalonate | 3 Hexamethylene | 0.18 |
| 5 Ethyl diethylmalonate | 4 Trimethylene | 0.10 |
| Group B: | | |
| 4 Isobutyl adipate | 3 Diethylene | 60 |
| 4 Butyl adipate | 5 Diethylene | 90 |
| 4 Methyl adipate | 3 Propylene-1,2 | 85 |
| 4 Isobutyl adipate | 3 Ethylene | 50 |
| 4 Ethyl adipate | 3 Ethylene | 63 |
| 4 Butyl azelate | 5 Diethylene | 40 |
| 10 Butyl adipate | 9 Diethylene | 72 |
| 4 Methyl isophthalate | 3 Diethylene | 6 |

The above table lists in Group A various polymeric plasticizers derived from dimethylmalonic esters employing various glycols other than the neopentyl glycol which is especially preferred; it is readily apparent from this table that all of these plasticizers have excellent characteristics and represent improvements over the prior art in many worth-while respects. However, it was quite surprising to find that those particular linear polymeric polyesters derived from neopentyl glycol serve in an unusually manner and constitute unusually effective valuable polymeric plasticizers.

EXAMPLE 2

The polymeric plasticizer of Example 1 was also prepared using calcium oxide as the catalyst. When the reaction was complete, the product was cooled to 100°

C. and enough glacial acetic acid was dissolved into the product to give a 100 percent excess over the amount required to neutralize the catalyst. The product was stirred and heated gradually to 200° C. and filtered. In this way all of the catalyst was removed from the product or destroyed.

EXAMPLE 3

A polyester was similarly prepared from a 6:5 molar ratio of dibutyl dimethylmalonate and diethylene glycol using sodium titanium butoxide as the catalyst.

EXAMPLE 4

Example 3 was repeated using a 4:3 molar ratio of diisobutyl dimethylmalonate and diethylene glycol.

It is particularly noteworthy that the polymeric plasticizers shown in Group A of the above table which were derived from diethylene glycol are highly resistant to hydrolysis and have desirable electrical characteristics. This is especially noteworthy since the oxygen bridge or ether linkage in diethylene glycol generally results in the formation of more water-sensitive polyesters than when ethylene glycol or other polymethylene glycols are employed. Thus, the use of diethylene glycol tends to produce molecules having more flexible and less crystalline characteristics which is quite advantageous, and yet these results are obtained without producing unsatisfactory water sensitivity as would be expected in accordance with the prior art.

It is especially preferred that the liquid or low-melting resinous plasticizers have a low degree of crystallinity which improves the ease of handling in shipping and which is also valuable in securing the most compatible relationship with the plastic composition to be plasticized. Crystallinity can be controlled by the choice of reactants in preparing polyesters. It is known that glycols containing increasingly long polymethylene chains tend to have increasingly great crystallizing tendencies. It is also known that the introduction of symmetrical side chain substituents tends to contribute to crystallinity as is usually expected from the use of neopentyl glycol. See Bjorksten et al., "Polyesters and Their Applications," Reinhold Publishing Co. (1956), especially the chapter on Tailor-Making Polyesters, pp. 158 and 159. It would be supposed that dimethylmalonic acid would probably also have characteristics contributing toward crystallinity because of the symmetrical grouping of side-chain substituents. It was therefore quite surprising to find that the preferred polymeric plasticizers of this invention have a low degree of crystallinity which does not interfere with their compatibility with plastic compositions.

A surprisingly effective dicarboxylic reactant useful in the preparation of polymeric plasticizers in accordance with another aspect of this invention is phthalic anhydride. The prior art points out that phthalic anhydride is not considered satisfactory for use as a dibasic acidic component in preparing polymeric plasticizers since it contributes a high degree of crystallinity to the plasticizer whereby such a degree of incompatibility results that this type of polymeric plasticizer is useless in resinous compositions. According to some work done by J. E. Hutchins and E. W. Wilson, it has been discovered that due to an unusual and unexpected property of 2,2-dimethyl-1,3-propanediol (neopentyl glycol), the replacement of a part of the bifunctional dicarboxylic compound with phthalic anhydride is actually advantageous. The polyester plasticizers so produced show a high degree of compatibility with the plastic composition being plasticized; moreover they also show excellent stability toward hydrolysis, good resistance to extraction by solvents in sudsy water, low volatility and good mechanical properties. The degree of compatibility of these plasticizers is such that they can either be used as a full plasticizing agent or if desired, blended with other plasticizers depending upon the particular properties desired. This discovery is applicable to modified polyester plasticizers embodying the present invention wherein a part of the dimethylmalonic acid can be replaced with phthalic anhydride. The plasticizers with which this present aspect of the invention is particularly concerned can be prepared in the following illustrative manner:

The neopentyl glycol, orthophthalic anhydride, another bifunctional aliphatic dicarboxylic compound (e.g. dimethylmalonic compound) and a monofunctional acid or alcohol are introduced in the proper molar ratios into a flask equipped to prevent removal of the major constituents at high temperatures and yet allow any volatile material such as water to escape. This can be accomplished by use of a steam-heated reflux condenser. The reaction can be carried out with or without the use of a catalyst. Advantageously, an acidic catalyst such as sulfuric acid or an alkane sulfonic acid or zinc chloride can be used in order to decrease the reaction time and temperatures. On the other hand, absence of a catalyst eliminates any necessity for extensive purification of the final product. After the flask has been charged with the essential constituents, the temperature is rapidly raised to about 150° C. and then more slowly raised over a period of a few hours to 195°–200° C. This temperature is then maintained for a period of 8–16 hours and the pressure is then reduced to about 10–25 mm. of mercury for a period of 4–8 hours. The mixture can then be cooled, excess acid neutralized with 20 percent caustic, or other such neutralizing material, the mixture then washed with hot water until neutral, and if desired decolorizing charcoal can then be added to the mixture, and finally, if necessary, it can be stripped at 125° C. or thereabouts under 100–150 mm. of vacuum (reduced pressure).

EXAMPLE 5

The procedure just described was applied to reacting 2.2 moles of adipic acid, 2.2 moles of phthalic anhydride, 4.8 moles of neopentyl glycol and 0.8 mole of the fatty acid fraction from coconut oil having a neutralization equivalent of 146 which were mixed together with 0.9 gram of zinc chloride. The process produced a 76 percent yield of a polymeric plasticizer having a saponification equivalent of 114 (theoretical 113.5). This represents a degree of polymerization of about 11.5, i.e. a molecular weight of 2825. The product had an acid number of less than 2. Similar results can be obtained using 2.2 moles of dimethylmalonic acid in lieu of the adipic acid.

EXAMPLE 6

This same procedure was applied to reacting 4.4 moles of neopentyl glycol, 3.6 moles of adipic acid, 1.2 moles of phthalic anhydride and 0.8 mole of decyl alcohol which were mixed with 0.9 gram of zinc chloride. The product was obtained in a yield of about 74.5 percent, had a saponification equivalent of 114 (theoretical 116), a degree of polymerization of 17 and a molecular weight of 4017. The acid number was less than 2. Similar results can be obtained by replacing the adipic acid with 3.6 moles of dimethylmalonic acid.

Examples 5 and 6 make it readily apparent to those skilled in the art how o-phthalic anhydride can be employed in the preparation of polymeric plasticizers using well-known procedures such as described in the above-mentioned U.S. Patent 2,617,779, employing neopentyl glycol as a substantial constituent which serves to control the crystallinity in the most unobvious and unexpected manner and which also contributes to other valuable characteristics. The concurrent employment of dimethylmalonic acid in conjunction with the phthalic anhydride further contributes valuable properties. Although patents in the prior art such as U.S. 2,020,247 and U.S. 2,555,062, relate to the condensation of various glycols with bifunctional carboxylic compounds such as phthalic anhydride, these patents cover products which are of greatly limited utility when compared to the blends of phthalic anhydride with dimethylmalonic acid and other bifunctional aliphatic dicarboxylic compounds and neopentyl glycol. These improved polymeric plasticizers possess enhanced processibility, reduced stiffness in plasticized products, improved compatibility, reduced hydrolytic decomposition, and many other improvements. It is possible to employ such plasticizers derived in part from phthalic anhydride which have relatively high molecular weights compared to the other polymeric plasticizers described above. Such molecular weights can range from as low as about 1000 up to 4000 or somewhat higher.

The preceding aspects of the invention pertaining to polymeric plasticizers derived from dimethylmalonic acid and those modified with phthalic anhydride emphasize special characteristics which are contributed by both the dicarboxylic compounds and the neopentyl glycol. The use of adipic acid in conjunction with neopentyl glycol results in a greatly improved polymeric plasticizer as described in the above-mentioned concurrently filed application of Wilson and Hutchins.

The processes applicable to the preparation of polyester plasticizers include either the process employing a substantial excess of the glycol or the dicarboxylic compound or the process employing a chain-terminating agent, such as a monofunctional acid or a monofunctional alcohol. U.S. Patent 2,617,779 is closely related to the preparation of such polymeric plasticizers although that patent does not teach the unusually valuable results which can be achieved from the sole employment of neopentyl glycol or homologous gem-dialkyl glycols. Moreover, these improved polyester plasticizers can be especially advantageously prepared by a process wherein the reactants may contain from a minimum of about 20 up to a maximum of about 40 molar percent excess of one of the bifunctional components.

Improved polymeric plasticizers can be derived quite unexpectedly from the condensation of neopentyl glycol with any of the straight-chain aliphatic acids such as succinic, glutaric, adipic, pimelic, azelaic, sebacic, suberic, etc. and also from the branched-chain acids such as 2-methylsuccinic, 3-methyladipic, 3-ethylsebacic, etc.; moreover, such polymeric plasticizers can also be derived from acids containing ether groups as represented by 3,3'-oxydipropionic acid, 4,4'-oxydibutyric acid. In addition, there can also be employed a minor proportion of unsaturated acids such as maleic, fumaric, tetrahydrophthalic, bicyclo (2.2.1)-heptene-2,3-dicarboxylic acid. In addition, cyclic aliphatic acids can also be employed as represented by the cis and trans isomeric hexahydrophthalic acids, bicyclo (2.2.1)-heptane-2,3-dicarboxylic acid. Also included are numerous isomers and homologs of these various compounds.

In addition to the aliphatic bifunctional dicarboxylic compounds, suitable aromatic bifunctional dicarboxylic compounds which can be similarly employed (preferably in minor proportion) include terephthalic, isophthalic, orthophthalic, 2-chloroisophthalic, etc. Of course, the special use of orthophthalic anhydride has already been discussed above.

The following examples will serve to illustrate the preparation of improved polymeric plasticizers depending essentially upon the valuable attributes derived from the use of neopentyl glycol:

EXAMPLE 7

Five molecular proportions of neopentyl glycol and four molecular proportions of adipic acid were placed in a flask equipped with a stirrer and a distillation column. Toluene sulfonic acid (0.5 percent by weight of the reactants) was added as the catalyst and the mixture was stirred at 140–150° C. for 3 hours. The temperature was then raised to 190–200° C. and held for 3 hours. Water was distilled from the vessel during this time. A vacuum of 50–75 mm. was then applied and the heating was continued for 3 hours to complete the reaction. In order to remove the catalyst, the product was dissolved in benzene, decolorized with charcoal, and then washed with 2 percent sodium bicarbonate solution, followed by a washing with water. The benzene was then removed by heating in vacuum at 90–100° C. The product obtained was a viscous oil which was readily soluble in the common organic solvents. This polymeric plasticizer was found to be very resistant to hydrolysis. After boiling for 96 hours in water, it was only 0.5 percent hydrolyzed. A similar polymeric plasticizer made with ethylene glycol was found to be hydrolyzed to an extent of from 50 to 80 percent under the same conditions.

The polymeric plasticizer of Example 6 is closely related to the above-mentioned Wilson and Hutchins plasticizers which are further modified by using 2-ethylhexanol as a chain terminator to secure additional valuable properties.

EXAMPLE 8

Thirty-five parts of the polymeric plasticizer of Example 7 was milled on heated rolls with 100 parts of cellulose acetate-butyrate. After granulating, the composition was molded on a standard injection press. The molded pieces were clear and the plasticizer showed no tendency to exude. There was substantially no loss of plasticizer when the molded pieces were heated 48 hours at 110° C. The resistance to extraction by water was excellent.

EXAMPLE 9

The plasticizer as described in Example 7 was also found to be compatible with cellulose triacetate. A dope was prepared by dissolving 100 parts of cellulose triacetate and 20 parts of the plasticizer in a mixture of 540 parts of ethylene chloride and 60 parts of methanol. The films cast from the dope were clear and flexible. Similar films were obtained by casting a dope prepared by dissolving 100 parts of polyvinyl chloride and 30 parts of the plasticizer dissolved in 400 parts of cyclohexanone.

Examples 10 through 13 list reactants used to produce polymeric plasticizers in the same manner as described in Example 7.

EXAMPLE 10

4 moles dibutyl isophthalate+3 moles NPG using 0.1% calcium oxide catalyst. The polymeric plasticizer had superior resistance to hydrolysis and water extraction from polyvinyl chloride and cellulose acetate-butyrate.

EXAMPLE 11

4 moles cis-4-cyclohexene-1,2-dicarboxylic acid, diisobutyl ester+3 moles NPG using 0.25% sodium butoxide. The polymeric plasticizer was useful in casting acetone dopes of cellulose acetate.

EXAMPLE 12

5 moles dibutyl 3,3'-oxydipropionate+4 moles NPG.

EXAMPLE 13

3 moles diisobutyl o-phthalate+1 mol dimethylmalonate+3 moles NPG.

The various polyester plasticizers described in general terms hereinabove and more specifically in the various aspects of the invention particularly described hereinabove provide permanence characteristics of outstanding value. Moreover, the compounding of these plasticizers with vinyl polymers and cellulose esters can be accomplished much more rapidly than heretofore. In addition, the polymeric plasticizers possess excellent hydrolytic stability and many other valuable characteristics. When vinyl compounders are selecting a polymeric plasticizer for vinyl synthetic resins, it is no longer necessary for them to compromise between desired permanence characteristics and the rate at which such plasticizers can be compounded. Heretofore, permanence characteristics of the available polymeric plasticizers have been a function of their molecular weight with the higher molecular weight compounds providing the best in permanence properties. When a high molecular weight plasticizer according to the prior art is employed, ease of compounding decreases and hence production rates fall. Thus, the new low molecular weight polyester plasticizers of this invention exhibit the superior permanence properties of the previously known and used higher molecular weight polymeric materials, and yet they can be compounded with a surprising degree of rapidity. As a result, vinyl compounders and other plastic composition manufacturers can use the polyester plasticizers of this invention without modifiers so as to achieve superior permanence while maintaining efficient production schedules. The polymeric polyester plasticizers of this invention are clear viscous liquids or low melting waxy solids which are highly resistant to hydrolysis and the plasticized plastic compositions remain virtually unaffected by moisture under the most severe outdoor weathering conditions. The use of these polymeric polyester plasticizers in vinyl films results in excellent low-temperature flexibility. The loss of these polymeric polyester plasticizers from vinyl films into hydrocarbons, soapy water and activated charcoal is extremely low, thus insuring complete plasticization throughout the life of the plastic material. Particularly valuable results are obtained when using the polyesters of this invention as vinyl plasticizers. The polymeric polyester plasticizers show little tendency to migrate to materials with which such vinyls might come into contact.

Although the invention has been described in considerable detail with reference to certain preferred embodiments thereof, it will be understood that variations and modifications can be effected without departing from the spirit and scope of the invention as described hereinabove and as defined in the appended claims.

I claim:

1. A linear condensation-type polyester of a neopentyl glycol and a dicarboxylic acid of which at least 70 mole percent consists of a compound having the formula:

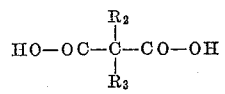

wherein each of $R_2$ and $R_3$ represents an alkyl radical containing from 1 to 4 carbon atoms, which polyester melts at below 60° to 70° C. and is a viscous liquid when boiled with water for 96 hours whereby hydrolysis does not exceed about 0.3%.

2. A plastic composition essentially composed of (I) a member selected from the group of plastics consisting of (1) cellulose alkanoates wherein the alkanoate radicals contain no more than 4 carbon atoms and (2) polymerized mono-ethylenically unsaturated polymerizable organic compounds, and (II) from 5% to 60% by weight of a polyester of claim 1 as a plasticizer.

3. A plastic composition of claim 2 wherein the plasticizer is a polyester of dimethylmalonic acid.

4. A plastic composition of claim 3 wherein the plastic is polyvinyl chloride.

References Cited by the Examiner

UNITED STATES PATENTS

| | | | |
|---|---|---|---|
| 2,483,726 | 10/49 | Floyd | 260—16 XR |
| 2,617,779 | 11/52 | Griffith | 260—31.8 |
| 2,643,989 | 6/53 | Auspos | 260—75 |
| 2,720,503 | 10/55 | Wellman | 260—75 |
| 2,744,078 | 5/56 | Caldwell | 260—75 XR |
| 2,744,092 | 5/56 | Caldwell | 260—75 |
| 2,859,195 | 11/58 | Reid | 260—31.8 |

FOREIGN PATENTS 588,833   6/47   Great Britain.

MORRIS LIEBMAN, *Primary Examiner.*

DANIEL ARNOLD, LESLIE H. GASTON, LEON J. BERCOVITZ, ALEXANDER H. BRODMERKEL, *Examiners.*